Aug. 8, 1939. C. W. FULLER Re. 21,173

SPIKE FOR GOLF SHOES

Original Filed March 1, 1935

INVENTORS
Clarence W. Fuller
BY Percy Freeman
ATTORNEY

Reissued Aug. 8, 1939 Re. 21,173

UNITED STATES PATENT OFFICE 21,173

SPIKE FOR GOLF SHOES

Clarence W. Fuller, Yonkers, N. Y., assignor to Shu-Life Spike Corporation, a corporation of New York Original No. 2,053,906, dated September 8, 1936, Serial No. 8,828, March 1, 1935. Application for reissue May 31, 1938, Serial No. 211,084

3 Claims. (Cl. 36—59)

The present invention relaes to a spike assembly for shoes and like footwear.

A primary object under contemplation is the provision of an assembly of this type which comprises a socket member and a replaceable spike, the socket member being positively and permanently anchored to the sole in a superior fashion, and the spike being locked in the socket against displacement—the two elements in their unification resisting effectively any tendency whatsoever to loosen, tilt or sheer during the most extreme stresses and strains of use.

This and other objects and advantages of the invention and the means for their attainment will be more readily apparent after perusal of the following specification taken in conjunction with the accompanying drawing, in which Fig. 1 is a bottom view of a golf shoe provided with spikes in accordance with the invention.

Figs. 2, 3, and 4 are respectively top plan, side, and bottom plan views of a preferred form of spike.

Figure 1:
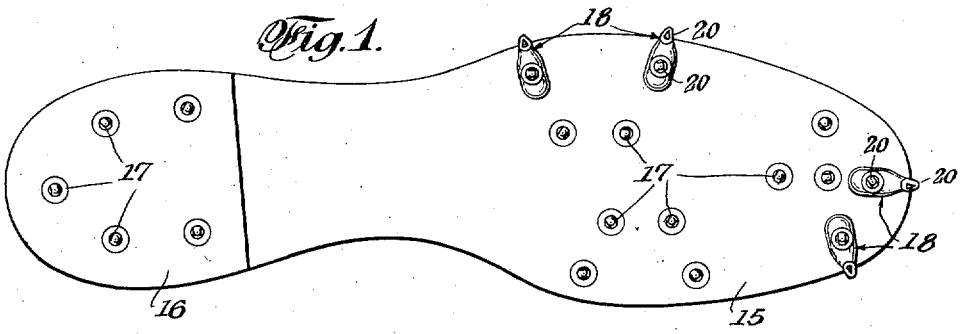
Figure 2:
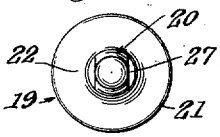
Figure 3:
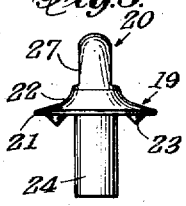
Figure 4:
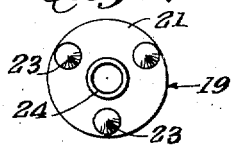

In Fig. 1 of the drawing, the sole and heel of a shoe are illustrated, respectively, at 15 and 16. The heel and sole are provided with spike assemblies 17—and if desired, additional assemblies 18, of the extension type may be judicially disposed about the marginal edges of the sole.

A preferred form of spike assembly is exhibited in Figs. 2 to 5 inclusive and embodies a socket 19 and a spike or calk 20. Socket 19 has an annular flange 21 thickened towards the center to present a substantially conical head with concave sides 22. The opposite side of the flange is perfectly flat, and is provided with equidistantly spaced teats or projections 23 and a hollow shank 24 simulating an internally screw-threaded tubular rivet, and having an extremity which is capable of being expanded and peened over, as at 25.

Spike 20, which cooperates with the aforesaid socket, has a screw stud 26 adapted for complemental engagement with the threads of shank 24, and a quasi frusto-conical point.

Figure 6:
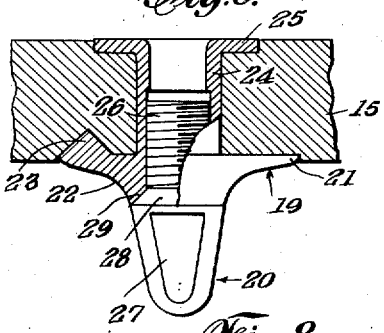
Fig. 6 is a similar view of an alternate form of spike.

The alternate form of the invention illustrated in Fig. 6 is the same as previously described except that the base of the spike 28 is beveled and fits to a nicety seat 29 of socket 19—this making for an assembly which is less susceptible of fracture.

Figure 7:
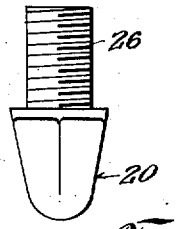
Fig. 7 is a side view of a modified form of replaceable spike portion.

If desired the spike element may assume the contour of a pyramid, as shown in Fig. 7.

Figure 8:
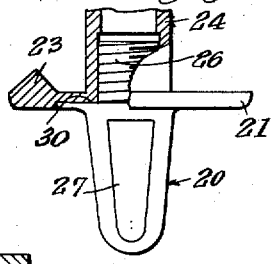
Fig. 8 is a broken elevational and sectional view of still another form of spike.

In the modification depicted in Fig. 8, flange 21 is constructed without any taper and is provided with a medial countersunk seat 30 to receive the corresponding base of the shank, and thereby insure increased stability of the set-up.

Figure 5:
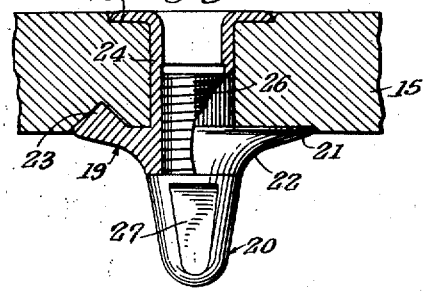
Fig. 5 is an elevational view, partly in section, of the spike shown in Figures 2, 3, and 4.
Figure 9:
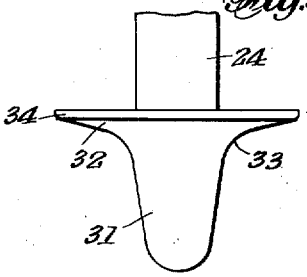
Fig. 9 is an elevational view of an integrally formed spike designed to provide maximum wearing surface.

Fig. 9 exhibits an integral spike element with a contour substantially the same as that shown in Fig. 5. Heretofore a spike of this type usually presented the form of a sharp cone with a truncated flange—one abruptly starting from the other. In the present case it will be seen that the cones 31 and 32 comprising the spike are blended into each other as a single relatively long cone with a suitable concave curve 33 filleting the corner formed at the juncture of the base of the cone with the flange 34. This permits making the flange quite thin without detracting from the strength of the unit, but on the other hand materially increasing its longevity.

In practice, and with particular reference to the preferred embodiment of my invention as disclosed in Figs. 2 to 5 inclusive, a piece of leather constituting the sole or heel of a shoe is punched to provide a suitable number and disposition of perforations. Sockets are placed in the several openings and with their free extremities protruding. Then with the assistance of an eyeletting or similar machine said extremities are expanded, upset, and peened over into the leather. Simultaneously—and this is of the essence—teats 23 projecting from flange 21 penetrate the leather through the opposite surface thereof. This operation virtually amounts to a double clinching with the retroverted flange 25 of the socket constraining pressure in one direction and the teats exerting pressure in the opposite direction. Moreover, the bite of the flange and the apexes of the teats are in substantial alinement—see Fig. 5, and the teats are strong and sturdy, and extend into the leather for a distance considerably in excess of the degree of bite of flange 25, thus reenforcing the assembly and reducing the likelihood of sheering directly at the point where the maximum strain occurs.

The very basis of spike or calk assemblies of this type resides in the security and permanents with which the socket is anchored in the leather. If ineffectual socket-securing means are relied upon and the leather becomes wet and then contracts, the socket manifestly loosens and the purpose of the unit is destroyed. With my present invention, due to the positive clinching action and constricting of the leather between opposite sides of the socket, there is no likelihood of the socket ever becoming loose, regardless of the degree of expansion and contraction or of the amount of distortion or strain to which it may be subjected.

The stable character of the socket mounting combined with the manner of locking the replaceable spike per se—particularly when the countersunk seat 30 is made available, constitute qualifications which are highly desirable, i. e., the units do not drop out; they do not tilt or slew around; they do not loosen from soaking and drying of leather; and they do not admit water seepage.

In its broader aspects the invention comprises not only the various means described but equivalent means for performing the recited functions. It is desired to reserve the right to effect such modifications as may come fairly within the scope of the appended claims.

I claim:

1. A spike for shoes comprising a fixed portion, and a replaceable portion; a flange integral with the fixed portion for engagement against the outer surface of the shoe sole, a depressed seat in the upper face of the flange, integral anti-rotational means on the under surface of the flange for engagement with the shoe sole, said fixed portion having a threaded bore communicating with the depressed seat, said replaceable portion having a screw shank for removable engagement with the threaded bore, and having a flange for interfitting engagement with the depressed seat whereby when both portions are assembled the top surfaces of two flanges will be flush.

2. A spike for shoes comprising a fixed portion and a replaceable portion; a flange integral with the fixed portion for engagement against the outer surface of the shoe sole, integral anti-rotational means on the under surface of the flange for engagement with the sole, said fixed portion having an axial threaded bore, said replaceable portion having a screw shank for removable engagement with the threaded bore, the outer end portion of the fixed member having a recessed seat, and the upper end portion of the replaceable portion having a face coacting with the recessed seat when the shank is screwed home in the threaded bore.

3. A shoe having a spike assembly for the sole or heel thereof, comprising a tubular member provided at its outer terminal with a flange having integral projections engaged in the sole or heel, and the opposite inner terminal of said member being upset or peened against the inner side of the sole or heel, thus effecting a positive anchorage of both terminals of said tubular member with the sole or heel, said member further, being internally threaded, and a calk having threaded means fitted into the said member in abutting relation to the flange thereof.

CLARENCE W. FULLER.